(12) United States Patent
Silverman

(10) Patent No.: US 12,546,751 B2
(45) Date of Patent: Feb. 10, 2026

(54) ULTRASONIC METHOD AND SYSTEM FOR FLUID QUALITY MEASUREMENT, CLASSIFICATION, AND MONITORING

(71) Applicant: BERKELEY SPRINGS INSTRUMENTS LLC, Cumberland, MD (US)

(72) Inventor: Eugene B. Silverman, Cumberland, MD (US)

(73) Assignee: Berkeley Springs Instruments LLC, Cumberland, MD (US)

( * ) Notice: Subject to any disclaimer, the term of this patent is extended or adjusted under 35 U.S.C. 154(b) by 107 days.

(21) Appl. No.: 17/411,605

(22) Filed: Aug. 25, 2021

(65) Prior Publication Data

US 2022/0065824 A1    Mar. 3, 2022

Related U.S. Application Data

(60) Provisional application No. 63/069,996, filed on Aug. 25, 2020.

(51) Int. Cl.
*G01N 29/44* (2006.01)
*G01N 29/036* (2006.01)
*G01N 29/46* (2006.01)

(52) U.S. Cl.
CPC ....... *G01N 29/4454* (2013.01); *G01N 29/036* (2013.01); *G01N 29/4481* (2013.01);
(Continued)

(58) Field of Classification Search
CPC ............. G01N 29/4454; G01N 29/036; G01N 29/4481; G01N 29/46; G01N 2291/0226; G01N 2291/02416
See application file for complete search history.

(56) References Cited

U.S. PATENT DOCUMENTS 7,246,522 B1 *   7/2007  Diaz ................... G01N 29/07
                                                      73/52
2016/0369624 A1 * 12/2016 Ahmad .................. G01F 1/666
(Continued)

FOREIGN PATENT DOCUMENTS

EP           3311123 B1 *  9/2019  ........... E21B 47/122
WO     WO-2019087125 A1 *  5/2019  ............. G01N 21/00

OTHER PUBLICATIONS

"Artificial Neural Network," Wikipedia (Year: 2023).*

*Primary Examiner* — Stephen D Meier
*Assistant Examiner* — Leo T Hinze
(74) *Attorney, Agent, or Firm* — Birch, Stewart, Kolasch & Birch, LLP

(57) ABSTRACT

A system and method for determining fluid quality or change in quality by training machine learning algorithms using ultrasound Fast Fourier Transform (FFT) signatures. The system includes one or more ultrasonic transducers embedded inside or outside of a pipe, piping, or vessel that allows a fluid to flow past or between the ultrasound transducers. The transducer's acoustic energy creates ultrasound pressure waves and localized heat due to acoustic cavitation. The cavitation creates bubbles that collapse creating ultrasound sonic energy in the time domain. Unique sonic time-domain signatures, distinctively associated with the characteristics of the fluids, are converted to FFTs to produce unique, well-defined frequency response signatures. Machine learning algorithms are used to identify, measure, and classify the unique frequency response signatures associated with a wide range of fluids.

6 Claims, 8 Drawing Sheets

(52) U.S. Cl.
CPC ..... *G01N 29/46* (2013.01); *G01N 2291/0226* (2013.01); *G01N 2291/02416* (2013.01)

(56) References Cited

U.S. PATENT DOCUMENTS

2019/0310230 A1\* 10/2019 Tortoriello ........... G01N 29/343
2021/0181159 A1\* 6/2021 Agostinelli ........ G01N 29/4472

\* cited by examiner

ULTRASONIC METHOD AND SYSTEM FOR FLUID QUALITY MEASUREMENT, CLASSIFICATION, AND MONITORING

CROSS REFERENCE TO RELATED APPLICATIONS

This application claims the benefit of U.S. provisional application No. 63/069,996, filed Aug. 25, 2020, the contents of which are incorporated herein by reference.

FIELD OF INVENTION

This application is directed to the use of ultrasound energy to measure, identify, and monitor fluids that flow through or are contained within a pipe, tank or similar vessel.

BACKGROUND

Determining the quality and purity of fluids is a critical product performance variable associated with a wide variety of industries including, but not limited to, consumer products, industrial chemicals, medical products, cosmetics, pharmaceuticals, and chemical manufacturing. Further to this quality control objective is the need for accurate, reliable and cost effective sensor systems that detect and quantify the presence and concentration of contaminants and unwanted solids within liquids used for industrial processes. The need for precise and reliable measurement and control of fluid quality is pervasive throughout the manufacturing world.

Proper quality control of fluids also depends on the ability to monitor and control the composition of liquid process streams including the distribution and size of particles. Additionally, the control of filtration operations is crucial within the mineral processing industry. Equally important is the preparation and control of feed streams within the pulp and paper industry, which depends on the ability to monitor and control the size of particles that are components of fluid process streams. The need for monitoring, measuring and controlling multiphase fluid streams is significant within the oil and gas industry. Instrumentation is used to control 3-phase separation processes for splitting production oil, water, and inorganic contaminants from off-shore oil production streams. Although there are numerous examples regarding the need for reliable and accurate measurements of fluid quality, the following discussion focuses on the need for detecting and measuring water contamination, media viscosity and percent solids within a wide range of fluids. As used herein, "fluid" means a liquid tending to flow or to conform to the outline of its container, and it is intended to include liquids that contain solids, i.e., liquid-solid mixtures that contain solid particles, whether homogeneous or heterogeneous.

To protect gas and diesel engine integrity, as well as to maintain emissions quality, it is necessary to detect water contamination in consumer and commercial fuel delivery systems. There is a need for the detection, measurement, and control of water contamination in fuel tanks servicing standby power generation plants in support of communication towers, data centers, and medical facilities. Readiness of standby diesel generators are impacted by fuel quality. Thus, it is necessary to control condensation in generators standing idol for long periods of time between cleaning cycles. Water mixed with fuel damages diesel engines. Additionally, water in turbine lubricant storage tanks destroys moving parts, alters the viscosity of lubricants, and causes chemical changes resulting in additive depletion and specification changes. Water also corrodes storage tank bottoms.

There is a range of known techniques for detecting and measuring water contamination in fuel systems. These include infrared spectroscopy, crackle and calcium hydride tests, Fischer methods, saturation meters, and acoustic methods.

Infrared (IR) spectroscopy uses a spectrometer that emits an incident light beam that passes through the media under investigation. The transmitted light is collected by a detector and is displayed as a color spectrum. The color spectrum represents the transmitted or absorbed light as a function of the wavelength of the incident beam. IR spectroscopy is often used to identify structures because functional groups give rise to characteristic bands both in terms of intensity and position (frequency).

The crackle test, which is a non-real time test, is conducted by simply dropping fuel or lubricant samples onto a hot plate. If the oil sample contains water, the sample bubbles, "crackles," and "pops." The crackle test is qualitative and does not precisely measure the amount of water present in an oil fluid.

The calcium hydride test is a non-real time field test that uses a known volume of oil placed in a sealed container with a known amount of calcium hydride. The container is shaken vigorously causing the water in the oil to react with the calcium hydride to produce hydrogen gas. The extent of the hydrogen off-gas is measured and converted to an approximate measure of water content in the sample.

A widely known non-real time method for detecting water in oil is by Karl Fischer coulometric titration. When conducted by a trained technician, the Karl Fischer analysis for water yields highly accurate and repeatable results and is considered a reliable analytical technique for determining water contamination. Also, the water can be measured in different forms such as dissolved within another liquid compound, freely separated from a compound, or emulsified after mixing.

Another technique for determining water quality is the use of relative humidity (RH) or saturation sensors. These sensors are used in a variety of industries where the humidity needs to be controlled, such as food services and pharmaceutical manufacturing facilities.

All of the foregoing procedures tend to function in non-real-time and lack varying degrees of accuracy that may be required for many manufacturing processes. This is also true for the measurement of fluid viscosity.

Viscosity is a quantity which relates to the flow of matter. The most common techniques for determining the viscosity of fluid involve the use of sensors in the nature of viscometers and rheometers. These techniques require an air/solution interface, which can cause erroneously high viscosity measurements. Within many industrial processes there is a critical need to control batch-to-batch consistency. For this purpose, flow behavior is considered an indirect measure of product consistency and quality. Rheometers are designed to determine a fluid's resistance to flow.

Rheometers are typically used for fluids that may have multiple layers of resistance due to the fluid's homogeneity or lack of homogeneity. Commercial limitations inherent in the use of rheometers relate to the influence of temperature variations, lack of accuracy, and non-real-time operations. Consequently, such limitations make rheometers unsuitable for real-time process control applications.

The measurement of solids concentration is also challenged with problems of accuracy and timeliness. The precise measurement of solids concentration in fluids is difficult to achieve. This is especially the case for solutions that lack homogeneity of suspended particle size and general composition. However, there are a number of general techniques for measuring total solids content in fluids. These techniques include the measurement of fluid volume by weight with or without solids, the use of mass spectrometry, and the use of nuclear magnetic resonance (NMR) techniques.

For the case of solids concentration by weight, total solids content in a liquid is typically expressed as a ratio of weights obtained before and after the fluid/solids media drying process. Measurements are typically made under controlled circumstances of temperature and time. Microwave techniques have also been demonstrated to achieve the same objective.

Measuring solids concentration within a fluid can also be accomplished using a mass spectrometer. Mass spectrometers produce charged particles (ions) from the chemical substances within the fluid's molecular structure. Mass spectrometers use electric and magnetic fields to measure the mass ("weight") of the charged particles. Significant limitations exist with mass spectrometer instrumentation including cost and complexity.

As noted above, NMR is a chemical analytical technique used to assay the composition and chemical structure of solutions, solids and mixtures. Solid/liquid samples are subjected to magnetic fields (generated by radio waves) which result in the excitation of the nuclei within the sample resulting in magnetic resonances that are detected by radio receivers. Unique magnetic characteristics are associated with specific compounds including the ratios between the compound and the surrounding fluids. Significant limitations exist with the use of NMR instrumentation including their complexity and cost. Due to the instrument's generation of radio frequency energy, certain safety precautions limit the availability for use by the general public.

As has been shown, there are a number of drawbacks with the use of conventional measurement techniques for detecting and measuring water contamination, media viscosity, and percent solids content in a wide range of fluids. Most techniques do not operate in real time and many are found, for the most part, within a laboratory setting.

One measurement technology that has been shown to improve quality control of fluids is the use of acoustics. Although acoustic techniques are commonly used for the measurement of flow in a wide variety of pipe and piping structures (for instance, U.S. Pat. Nos. 6,575,043 and 8,489, 342) there are a number of applications where acoustic techniques have been used to characterize materials. For instance, the use of acoustics for measuring water contamination has been demonstrated by Greenwood (U.S. Pat. Nos. 6,877,375 and 7,140,239) who measured ultrasonic attenuation using reference signals compared to real-time in-situ processes and by Sinha (U.S. Pat. No. 8,176,783) based on ultrasonic signal attenuation. Kashid (U.S. Pat. No. 10,801, 428) applies the acoustic speed of sound and signal attenuation in fuel in order to estimate ethanol content. The use of acoustics for measuring solid concentration (and particle size and composition) has been demonstrated by Suslick, et al. (U.S. Pat. No. 9,855,538) by measuring ultrasonic attenuation using a reference signal. Prakask (CA 2761431 A1) demonstrates the use of the attenuation of an ultrasonic signal for determining particle size. Riebel (U.S. Pat. No. 4,706,509) uses ultrasound for measuring solids concentration and particle size in fluids as well. Tohidi (US 2008/0041163 A1) has shown that ultrasound can be used for precise particle detection and sizing. Glad (U.S. Pat. No. 5,255,564) demonstrates the use of the speed of sound for determining the identity of liquids. Moradi (US 2010/0063393) shows that ultrasound time and frequency domain signals can be used for detecting, diagnosing and assessing cancer and related abnormalities in biological tissue.

The use of acoustics for measuring fluid viscosity has also been demonstrated by Kruger (WO 2007/003058 A1) by measuring ultrasonic attenuation using a reference signal and by Heim (WO 2020/264497) based on the attenuation of an ultrasonic signal. Wenman, et al. (PCT WO 02/16924 A1) has shown that a standing wave interferometry method can be used to measure sub-micrometer particles associated with carbon concentrations in used engine oil, and Povey et al. (EP 1 092 976 A3) shows a method for the use of ultrasound related to "acoustic speckle" signals reflected from particles within opaque liquids.

Although these references may share some features with the technology in the present invention e.g., each uses acoustics to determine fluid quality, the similarities end there. Fluid quality measurement techniques in use today and discussed above are difficult to use, lack accuracy and repeatability, are not robust when used outside of the laboratory, and the equipment is difficult to calibrate and to keep calibrated. As a result, there remains a need for improved quality control of fluids, improved solids detection, and more precise detection and measurement of contamination within a wide range of industrial settings.

SUMMARY

This application addresses the limitations and shortcomings of current technologies for determining and monitoring fluid quality by using acoustic energy in the ultrasonic domain to insonify fluids and suspended particles in fluids, thereby creating heat and pressure waves, and ultimately bubbles, due to acoustic cavitation. Gas and oxygen are drawn out of the bubbles located within the microstructure of the fluid and suspended materials. The acoustics associated with the collapsing bubbles create acoustic signatures in the frequency domain distinctly associated with the characteristics of the fluid, including fluid density as well as diluted and non-diluted contaminants such as suspended solids.

Acoustic profiles of fluids are created by (1) using ultrasound energy to insonify fluids and fluid-solid mixtures, thereby creating an ultrasound signature in the time domain, (2) converting the ultrasound time domain energy into the frequency domain, and (3) creating a frequency domain response for specific fluid samples, labeled as a unique frequency response signature. The unique frequency response signatures can be compiled into a frequency response signature library, which can be used to train an artificial neural network (ANN) to identify and classify future fluid samples in real time.

The method uses a multi-layered real-time process that integrates the acoustic profile of insonified fluids, employs an artificial neural network (ANN) for identifying and classifying unique acoustic profiles, and uses the classification results to (1) create an analogue or digital display regarding fluid quality, and (2) regulate a process for controlling an industrial component such as a valve or pump.

One aspect of the invention is a method for measuring fluid quality by insonifying a fluid to be measured using ultrasound energy over a period of time, thereby creating a time domain ultrasound signature; converting the time domain ultrasound signature into the frequency domain, resulting in a frequency response signature; and matching the frequency response signature to a unique identifying frequency response signature of a solid or contaminant to be identified.

A second aspect of the invention is a method for measuring fluid quality by insonifying a fluid to be measured using ultrasound energy over a period of time, thereby creating a time domain ultrasound signature; converting the time domain ultrasound signature into the frequency domain, resulting in a frequency response signature; creating a frequency response signature library comprising frequency response signatures corresponding to impurities in fluid samples that have been measured; training an artificial neural network (ANN) to identify and classify future fluid samples in real time; and correlating the frequency response signature from the fluid being measured to the frequency response signature library to identify impurities in the fluid.

A third aspect of the invention is a system for determining product quality within a fluid media, including a piezoelectric signal emitter transducer; a piezoelectric signal receiver transducer; transducers located from 0 degree to 180 degree from each other (or within a 180 degrees half-concentric circle from the transmitting transducer); transducers connected to electronics that provide pulse and receive signal power; a computer with analogue-to-digital converter capabilities; computing capability for digitizing, filtering and processing the signal from the analogue-to-digital converter; and computer hardware and software for controlling the functioning of a valve or pump.

A fourth aspect of the invention is an ultrasonic-based fluid quality measurement, classification, and quality monitoring system having one or more ultrasound transmitting and receiving transducers operating in a single frequency pulse echo or multiple frequency chirp mode but not confined to a single frequency or particular range of frequencies; software and firmware to convert time domain ultrasound data into the frequency domain in the form of an FFT; software and firmware for (i) establishing a computer database of FFT signatures associated with different fluids and fluid characteristics, e.g., with different concentrations of suspended solids creating different degrees of fluid turbidity; (ii) creating a real-time data stream or base of FFT signatures associated, by example, with the real-time acquisition of FFT signatures from fluids; (iii) comparing a data stream or data base of FFT signatures to a previously stored FFT signature data base in order to identify and classify particular fluids or fluid characteristics.

A feature of the invention is the use of machine learning algorithms for the identification, measurement, and classification of the unique composition of a fluid including the detection and quantification of contaminants. The results of the signature classification results can occur in real time in order to control valves and pumps typically found within a range of process-control industries.

Another feature of the invention is that it can include an analogue or digital user display.

Another feature of the invention is that it can provide for the control of a discrete or proportional valve or similar mechanical operator.

Another feature of the invention is that it can interface to the Internet and be controlled remotely.

Another feature of the invention is that it can be packaged for a fixed location or it can be portable.

Another feature of the invention is that it can operate wirelessly.

An advantage of the invention is that it can insure the reliability of fuel delivery systems.

Another advantage of the invention is that the generation, reception, processing and classification of ultrasound energy occurs in near real time allowing for the control of external process-control components such as valves and pumping systems.

Non-limiting examples of commercial applications for the technology of the present invention can include: fluid turbidity; sizing bubbles in carbonated beverages or supplied $CO_2$; food contamination; food liquid product quality control, e.g., milk, orange juice; chemical product quality control; food forensics; water content in fuel delivery systems; pharmaceutical and cosmetic product quality; particle sizing; and detecting and measuring gas hydrates, wax and asphaltenes in production oil streams.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Ultrasound is generated by a piezoelectric signal emitter, e.g., a transducer, which converts electrical energy to acoustic energy. The piezoelectric emitter can be of any crystal material, such as lead Zirconate Titanate (PZT), lead Metaniobate, composite, etc. In the present application, the ultrasound energy is propagated into a liquid that is subjected to alternating periods of compression and rarefaction of the acoustic pressure wave. The amplitude of the wave decreases with distance due to both energy absorption and scattering. Absorption is a mechanism where a portion of the wave energy is converted into heat, and scattering is where a portion of the wave changes direction due to, in some cases, suspended particles. During rarefaction, gas is drawn out of solution to form bubbles, which can oscillate in size and collapse, i.e., implode, rapidly due, in part, to temperature increases within the microenvironments surrounding the bubbles. The collapse of bubbles creates cavitation throughout the interaction of transmitted ultrasound energy at frequencies characteristic of the fluid. This unique pressure wave is received by a receiving transducer, and can be used to identify the fluid and/or characteristics about the fluid.

Figure 1:
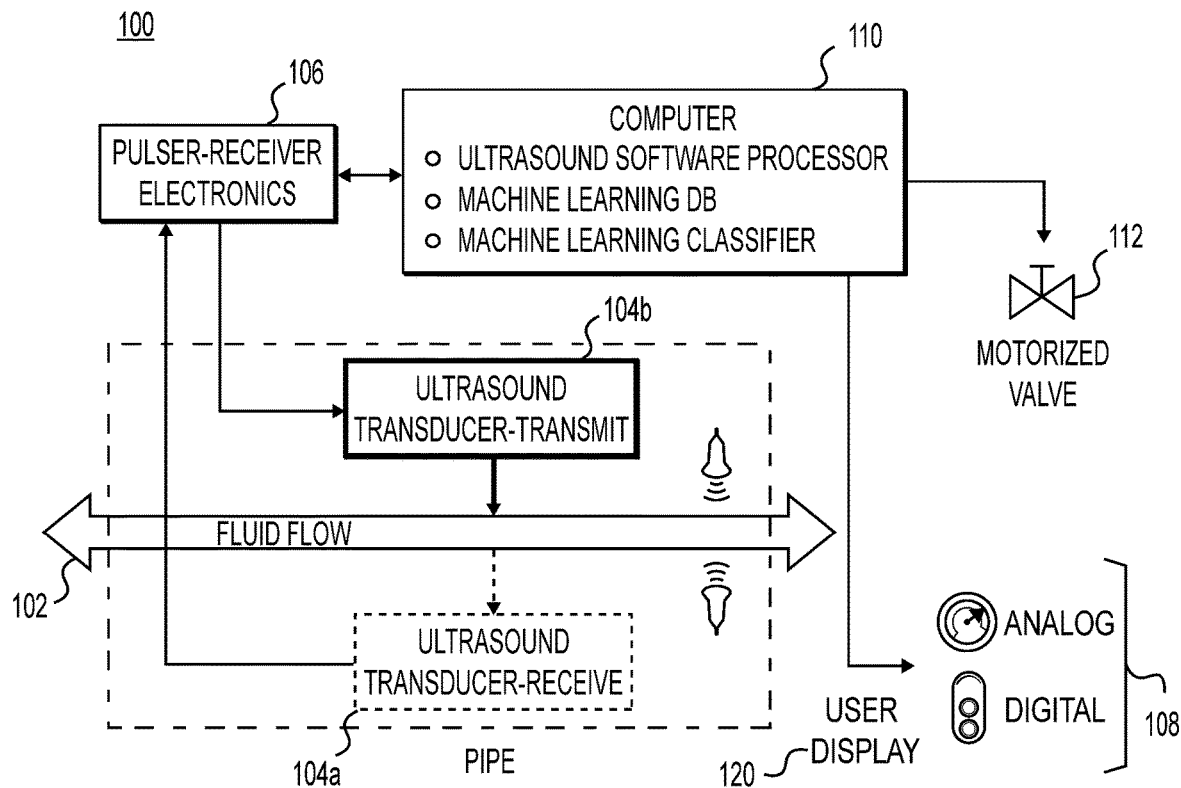
FIG. 1 is a block diagram of one many possible embodiments of a system of a fluid quality detection and monitoring system.

Referring generally to FIG. 1, there is shown a flow diagram representing one of many possible embodiments of a fluid quality classification and monitoring system 100. The system 100 includes an ultrasonic insonification pathway 102 with one or more ultrasonic transducers 104a,b positioned along the ultrasonic insonification pathway 102. The transducers 104a,b optionally, but preferably, are positioned opposite one another, i.e., 180 degrees from each other; however, the insonification process can occur between any two transducers 104a,b at any relative angle from each as long as there is insonified liquid flowing between them. Transducer 104b pulses at one or more frequencies, and transducer 104a receives the pulse. In an alternative embodiment, a single transducer can be used in a pulse-echo mode.

The system 100 can use ultrasound energy in the range from about 20,000 cycles per second (20 kHz) to 7 million cycles per second (7 MHz), although the system 100 is not limited to a particular frequency range and can operate at frequencies well above 20 MHz. A preferred frequency range is between about 500 kHz and 50 MHz, with a most preferred range being between about 500 kHz and 5 MHz. The concentration of fluid being identified or monitored can be within a wide range of densities and specific gravities. The ultrasonic frequencies and amplitudes can be adjusted to penetrate high density and low density fluid solutions, such as coal slurry (high density) and distilled water (low density). The ultrasonic frequencies and amplitude can be adjusted as necessary to penetrate or reflect off of low and high density particulates and solids such as fine sand or stone particles.

As fluid flows between the transducers 104a,b, a programmed general purpose computer 110 can be used to digitize the acquired analogue signals and to create time domain ultrasound signature. Alternatively, an analog-to-digital converter 108 can be networked to the system 100. Time domain ultrasound signatures can range from a few microseconds to milliseconds. The time domain ultrasound signal quality is disrupted by the physical quality of the liquid that is present between the emitter and receiving transducers 104a,b. The fluid can be stagnant or flowing.

The transducers 104a,b optionally but preferably are interfaced to ultrasonic transmit and receive electronics 106 that provide pulse and receive signal power. The ultrasound transmit and receive electronics 106 can include a board that creates a pulse and sends it via a wire to the transducer 104b. The board in the ultrasound transmit and receive electronics 106 can then receive a return signal from transducer 104a and transmit the returned signal to computer 110 through a USB port or wirelessly. The pulser-receiver board in the ultrasonic transmit and receive electronics 106 can get its power from the USB interface with the computer 110. Alternatively, the pulser-receiver board in the ultrasonic transmit and receive electronics 106 can be integrated into the same housing as the computer 110. The computer 110 can be any specially programmed general purpose computer. In an alternative embodiment, the computer 110 can be a portable Raspberry Pi.

The transmit and receive electronics 106 receive the return signal from transducer 104a in the analogue domain. The returned signal can be converted from analogue to digital by computer 110, or the transmit and receive electronics 106 can transmit the return signal to an analogue-to-digital converter 108 for conversion. The computer 110 can be used for digitizing, filtering and processing the signal from the analogue-to-digital converter 108. The computer 110 can be used to control the functioning of a valve 112 or pump on industrial equipment integrated with the system 100.

The analogue to digital converter 108, or alternatively the computer 110, converts the time domain ultrasound signature into a frequency domain signature with the use of a fast Fourier Transform (FFT) in order for the computer 110 to develop a frequency response unique to the fluid that has been insonified. The FFT of the insonified fluid between the transducers 104a,b characterizes a unique frequency response signature that represents the amplitude, i.e., voltage or power, for each frequency in the generated frequency spectrum.

An FFT algorithm is used to convert components of a returned signal, in this case turbulence and cavitation, from its time domain to a representation in the frequency domain. There are a number of different types of FFT formulas but the most common one used for discrete Fourier analysis is noted below and is used in the current embodiment of the fluid classification and monitoring system 100:

$$X_k = \sum_{n=0}^{N-1} x_n e^{-i2\pi k \frac{n}{N}} \quad k = 0, \ldots, N-1,$$

The time domain ultrasound signature shows the travel of the acoustic energy from one transducer to another located at or within a 180 degrees half-concentric circle from the transmitting transducer. The resultant FFT is computed from the time domain ultrasound signature. By measuring sound energy within the captured frequency spectrum, a unique frequency response signature is created and associated with the fluid flowing between the two transducers 104a,b. Unique amplitude/frequency profiles are created that represent specific characteristics of the fluid such as: suspended solids; size of organic or inorganic particle droplets; entrapped air in the form of bubbles; oil, polymer and colloidal concentrations, etc. These profiles can then be used as a reference to identify similar characteristics in other fluids to be monitored.

In addition to the unique frequency response signature created, the overall acoustic power of the profiles defined as the root mean square (RMS) of the energy can be used to characterize each profile such that acoustic energy that is reduced between the gradient of the two transducers 104a,b results in attenuation of energy which is used by an artificial neural network (ANN) to classify the fluids.

After the fluid time domain signals are acquired, the fluid frequency response signatures are then used to train an artificial neural network (ANN). Each digitized frequency/amplitude (F/A) profile is considered an input to an ANN to generate a library of frequency response signatures. For instance, a liquid that contains suspended solids will create a degree of turbidity. Degrees of turbidity can range from 0

NTU (Nephelometric Turbidity Unit) to over 100 NTUs (lack of optical transparency). NTU is a unit of measurement for determining the clarity of a fluid, or the extent of the presence of suspended particles in water. High concentrations of suspended solids in a fluid results in less optical transparency and is tagged with a high NTU value. Each degree of turbidity has a unique frequency response signature. Such profiles become inputs to an ANN, which is "trained" through traditional neural network protocol. This relationship between the F/A profile and NTU values become the components of the ANN library against which future liquid samples are compared and classified into their likely turbidity, or NTU, category. The creation of a frequency response signature library for any type of fluid is not limited to a particular ANN architecture.

The ANN is taught how to classify a particular fluid quality such as the density of a water-sand mixture by acquiring samples of the time domain signal associated with different fluids; converting the time domain signals into frequency domain signals to establish distinct FFT signatures for each fluid; teaching an ANN to distinguish individual fluids to establish a library of signatures associated with a range of fluids.

ANNs are mathematical models designed to loosely resemble the human nervous system or, more specifically, the connectivity among neurons within the brain. ANNs have the ability to learn relationships between groups of data by "seeing" many examples of the data. The learning process depends on many examples and accurate feedback. ANNs are able to learn relationships between real-world data and the underlying cause by looking at many specific instances and receiving feedback regarding the error associated with hitting a target.

ANNs learn by the same learning scheme, called supervised learning, that guides much of human learning. There are many neural network supervised learning schemes available. The most common and the one used in this invention is the backpropagation method made popular by Rumelhart, McClelland, and Williams. For an ANN to use backpropagation it must be able to accept data in the form of an input to the ANN system, respond with an answer in the form of a system output, and determine the accuracy of the response. The further the network's response is from the desired target, the greater the changes it needs to make to learn the proper association between the input and the output.

Figure 9:
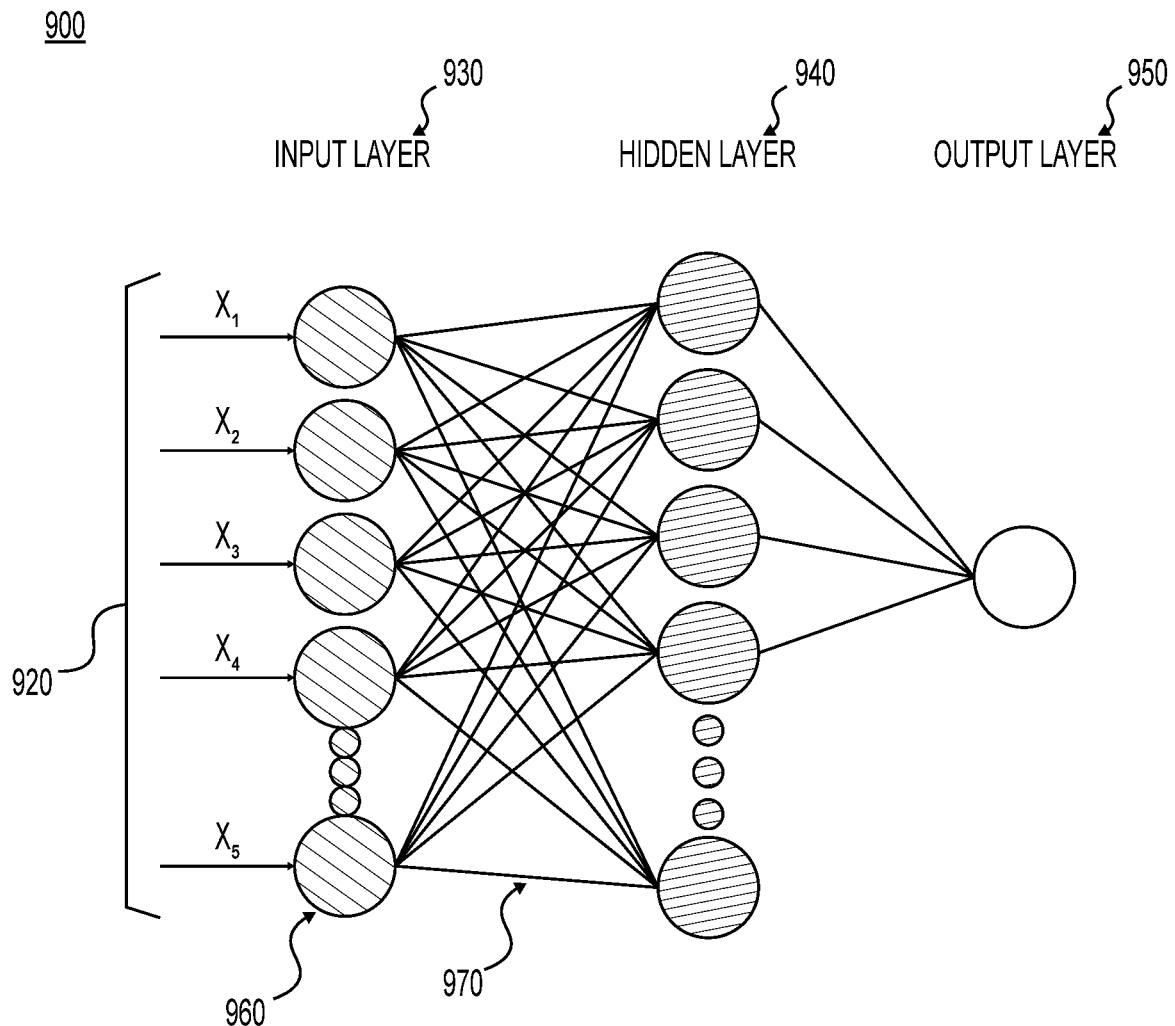
FIG. 9 is a diagram of a 3-layer artificial neural network.

In reference to the present invention, the ANN 900 backpropagation algorithm receives the frequency response signature data 920 which represents the ANN's input layer 930 as shown in FIG. 9, which represents a three layer network: an input layer 930, a hidden layer 940, and an output layer 950. The nodes 960 on the layers 930, 940, 950 are joined by weighted connections 970 as shown by the lines between nodes 960. Each connection 970 has a value associated with it called a weight. The ANN 900 reads the FFT input data 920 represented by a fluid sample, in the case of the present application. The network processes the data 920 using the values of the connecting weights 970 and eventually produces an output 950 that is a numerical value or textual representation of the input sample. Initially, these connecting weights 970 are set to random values within the weight initialization range. The object of training an ANN is to determine the values of the weights associated with the particular fluid sample which will produce the correct output for each given FFT input signature.

The current invention is not limited to the number of input/output values or layers necessary to achieve a desired solution. Furthermore, the ability of the invention to perform is not limited to any particular architecture processing approach, e.g. forward or backward pass transfer functions. The ability of the network to discriminate the FFT signatures among multiple degrees of fluids, can be achieved by different ANN layers and transfer functions.

As shown in FIG. 1, the output of the system 100 can be accessed by an operator through a user interface 120 to obtain real-time information regarding the fluid quality in the form of turbidity, solids density, presence or absence of contaminants, e.g., water in fuel, product purity, and particle distribution. The display of information can be in the form of analog information, digital information or information that controls a process such as a valve 112 or pump. The active control of an industrial process function can be achieved through a standard programmable industrial logic controller.

Figure 2:
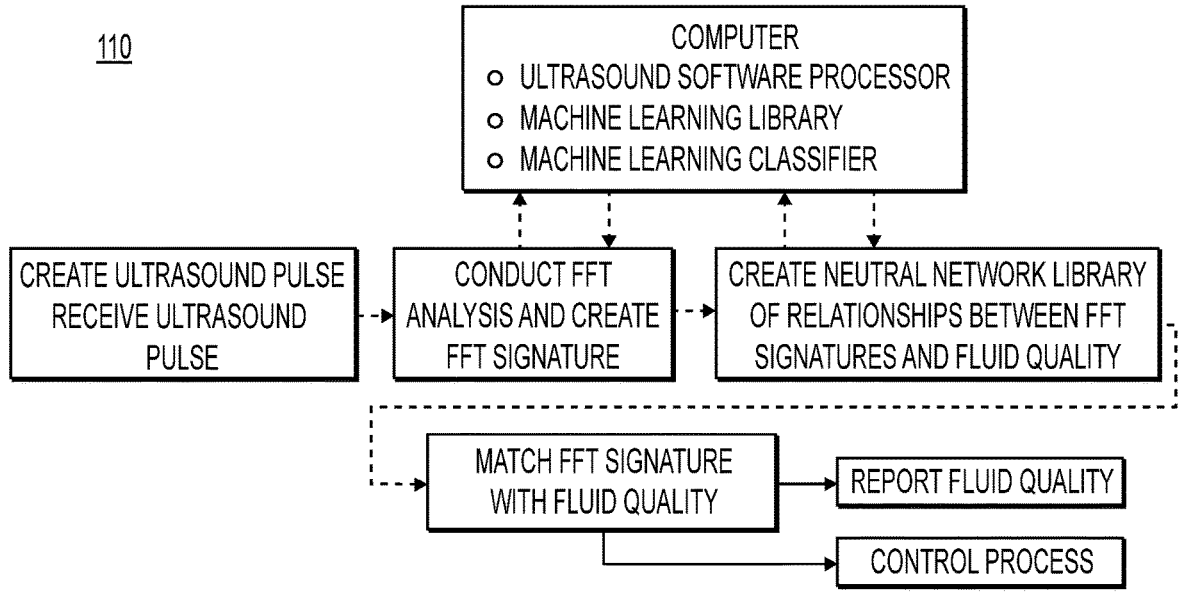
FIG. 2 is a block diagram illustrating the interaction among a computing system, signal processing software, and an artificial neural network and a library of fast Fourier transform signals.

Referring generally to FIG. 2, there is shown an embodiment of the computing system 110, which contains signal processing software and data storage capabilities including ANN libraries required to store the frequency response signature characteristics of the stored fluid quality profiles. The computer code can comprise any software or firmware capable of controlling the timing of the transmitted and received pulses, converting the time domain signatures to frequency response signatures, and storing the output data.

Figure 3:
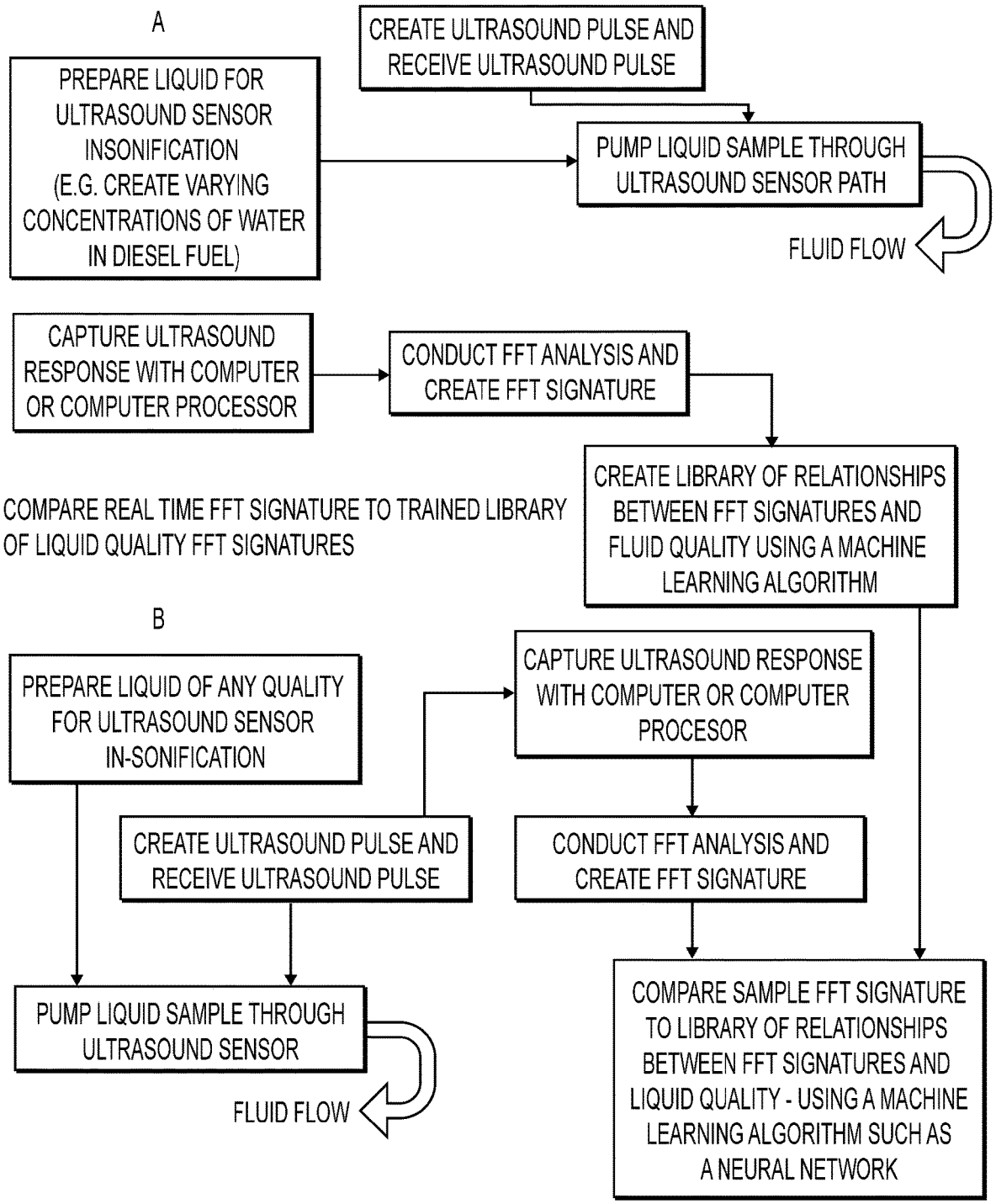
FIG. 3 shows a method for creating a library of fast Fourier transform signals, and for using an artificial neural network to determine and monitor fluid quality.

As shown in FIG. 3 the ANN data storage section is organized into two sections: an FFT-created a priori ANN library containing the results of previous ANN training results and the current real-time data buffer with fluid quality FFT signatures which are to be compared to the static FFT-created a priori ANN reference library.

Figure 4:
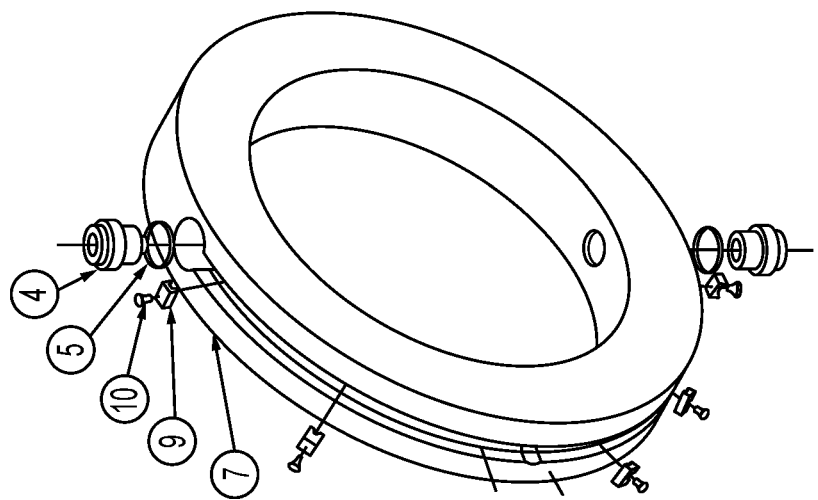
FIG. 4 is a perspective view of one of many possible embodiments of a 2-transducer sensor ring.

Referring generally to FIG. 4, two or more ultrasonic transducers are located across from each other at any distance, and in the present example the transducers are integrated into a ring or insert that can be interfaced through two pipe flanges within a processing control application. The position of the transducers can be anywhere within the 180 degrees. As noted earlier; however, the insonification process will occur between the two transducers at any relative angle from each other. The transducers can be constructed using PZT, Composite or similar piezoelectric transducers.

Figure 5:
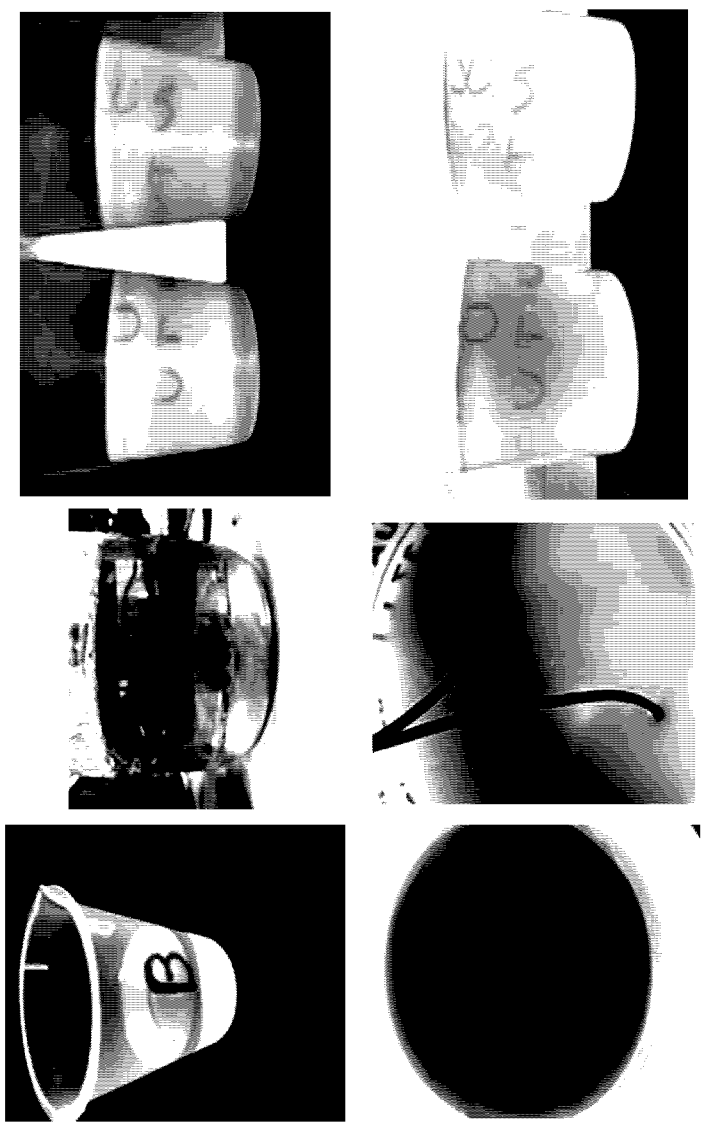
FIG. 5 shows examples of fluids capable of being insonified by one or more transducers.

Referring generally to FIG. 5, a wide variety of liquids can flow between the transducers in order to train an ANN and create a library of frequency domain signatures. The transducers can be located on the outside of a pipe, tank, vessel or within a fluid filled structure of any inside diameter.

Figure 6:
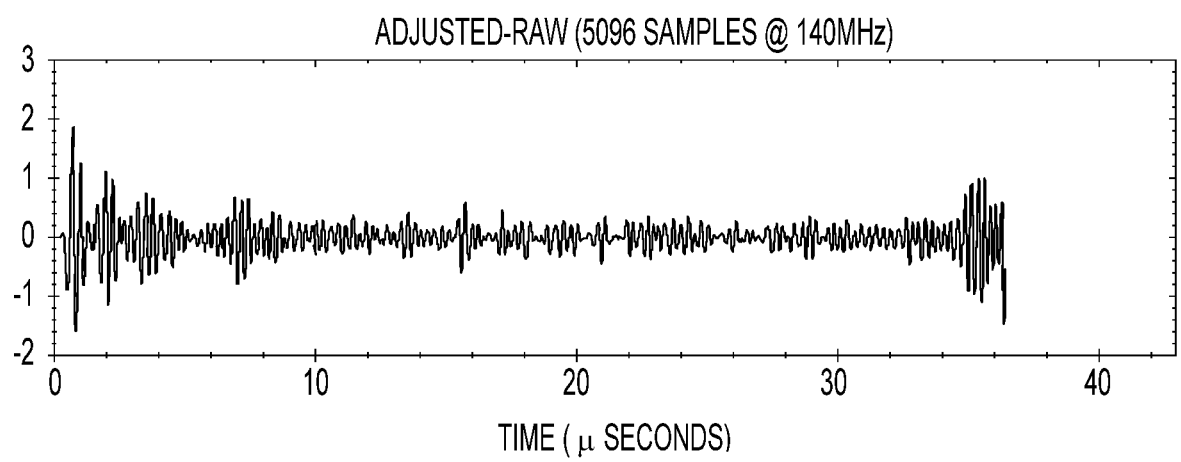
FIG. 6 shows a time-domain response from an ultrasonic emitter/receiver.

Referring to FIG. 6, there is shown a time domain ultrasound signature generated by scanning fluid from FIG. 5 using the ultrasound send/receive transducers.

Figure 7:
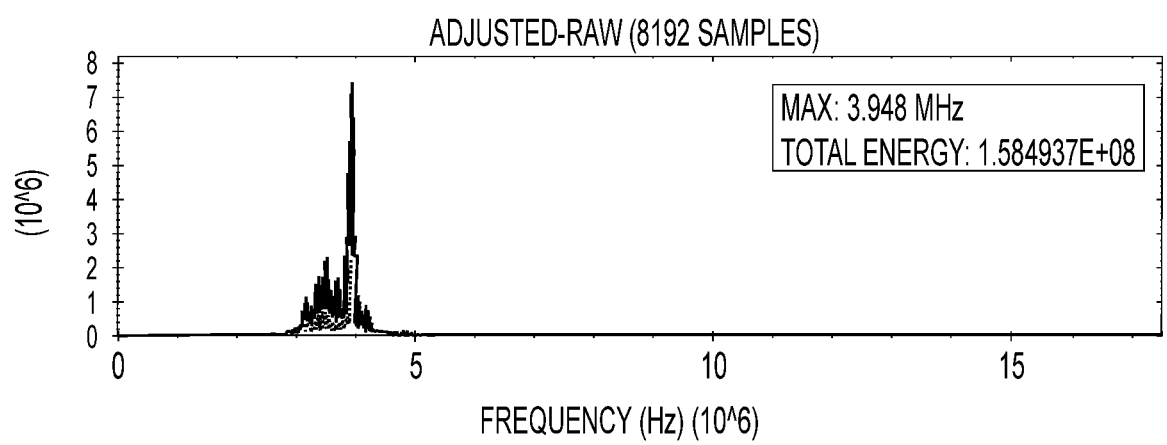
FIG. 7 is an illustration of a time domain ultrasound signature signal converted to a frequency response signature.

Referring generally to FIG. 7, the time domain ultrasound signature shown in FIG. 6 has been converted into a frequency domain signature and displayed as an FFT.

Figure 8:
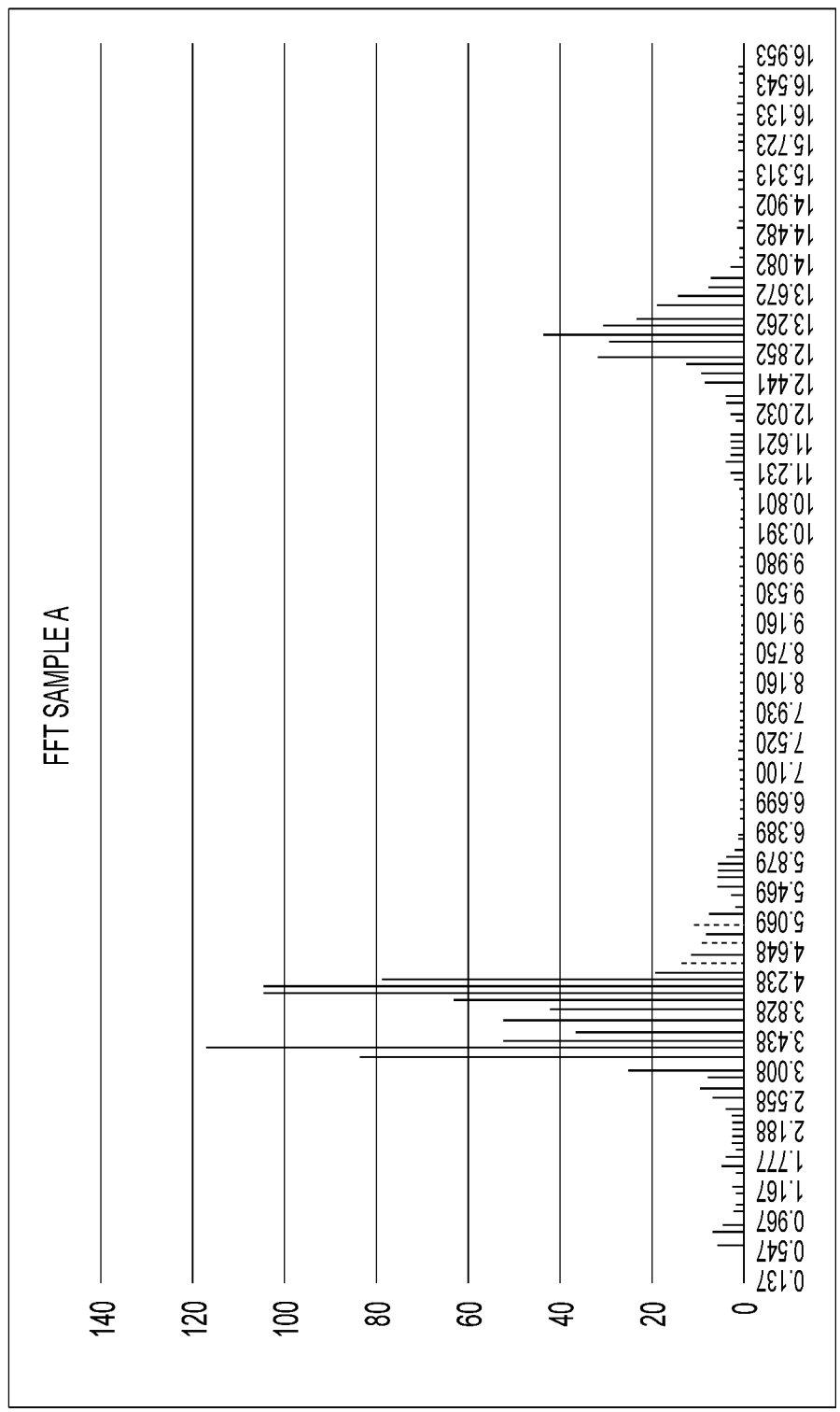
FIG. 8 depicts two fast Fourier transform signatures showing the difference between two profiles from the two liquid samples with different concentrations of solid particles.
Figure 8:
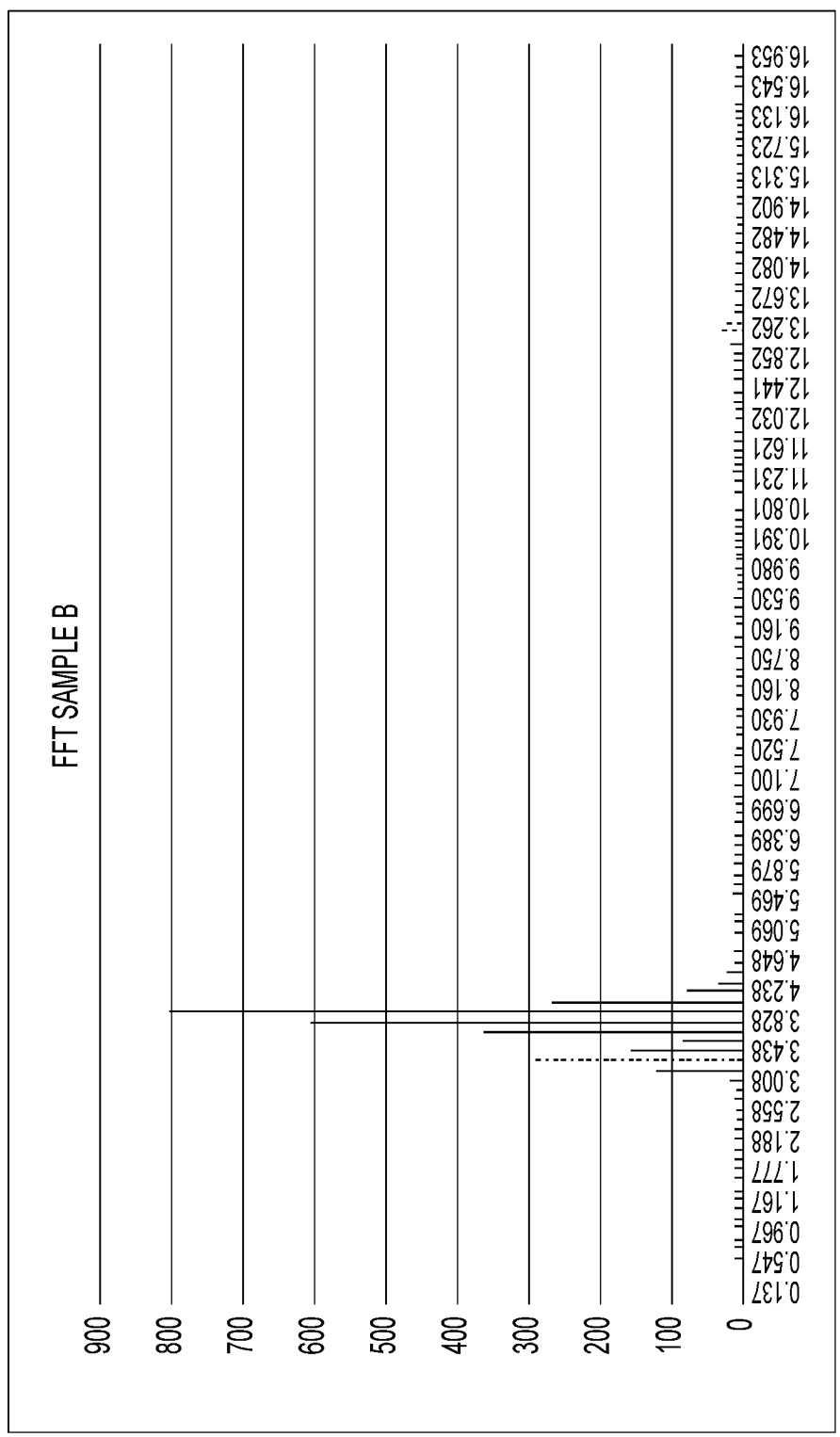

Referring generally to FIG. 8, two FFT profiles can be created by subjecting two different fluids to the ultrasound send/receive transducers and electronics. The signature profiles have uniquely different frequency response characteristics due to the difference in the content of the fluids. Unique libraries of FFT-generated signatures can include, but are not limited to, fluid turbidity, solids concentration, percent concentration of water and fuel mixtures, consumable fluid products including potential degrees of contamination, fluid salt concentrations and carbon dioxide concentrations.

Figure 10:
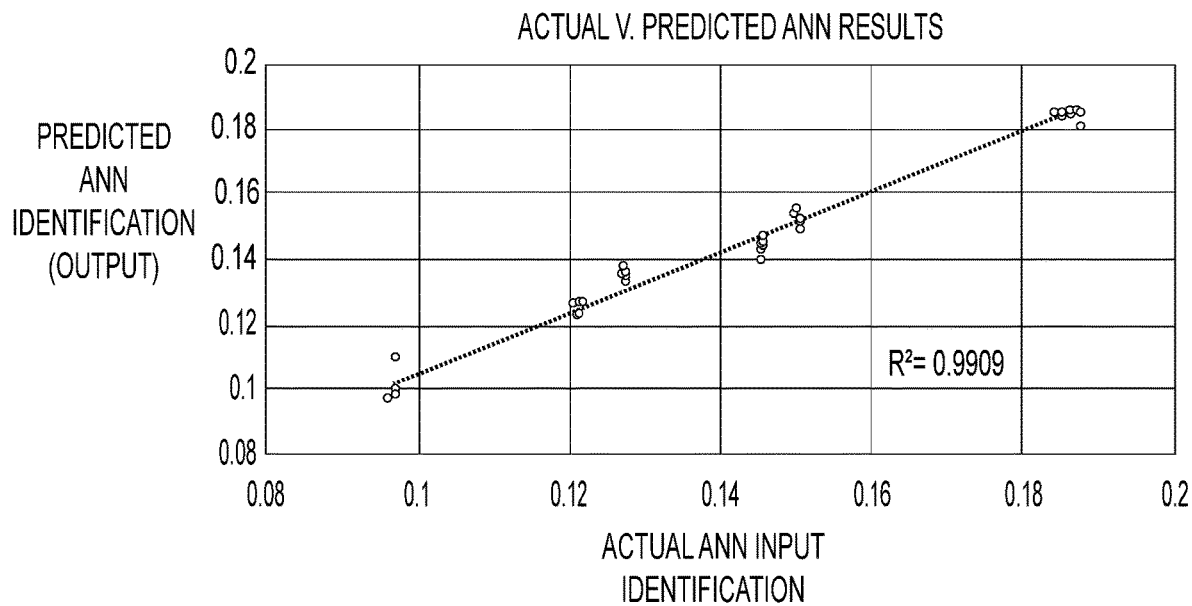
FIG. 10 illustrates identification of ten (10) different concentrations of water in a fuel mixture by an artificial neural network; and, FIG. 11 is a flow diagram showing the output of a real-time implementation of one of man possible embodiments of the present invention.

As shown in FIG. 10, the classification performance of the ANN using new data streams is very accurate when compared to the previously-created FFT-created a priori ANN library. The performance is demonstrated by the +99.9 percent best fit trend line.

Figure 11:
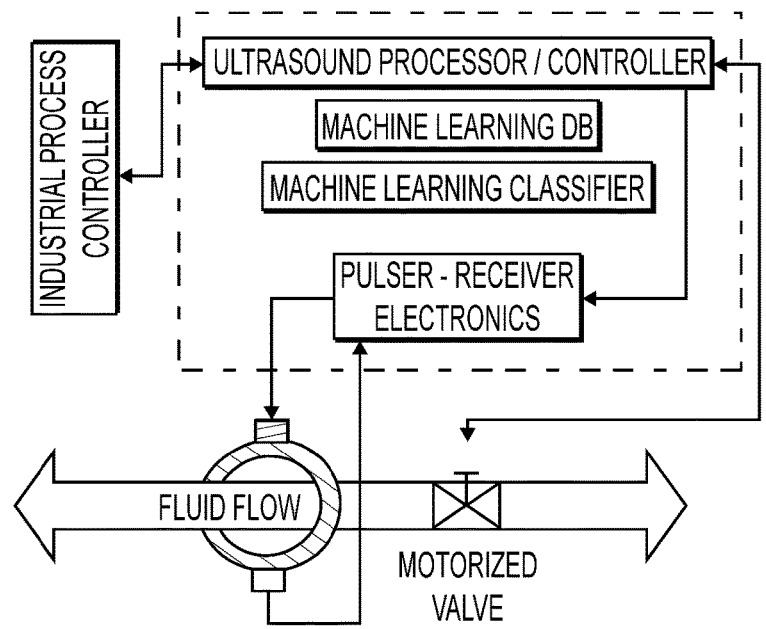

As shown in FIG. 11, in the case of a real-time process control implementation, the output of the ANN can discretely or proportionally control a valve for the diversion control of fluid flow; for chemical treatment control, for flow diversion or similar applications where real time, precise control of fluid/fluid-solids processes is necessary.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention. Thus, the breadth and scope of the invention should not be limited by any of the above-described exemplary embodiments.

What is claimed is:

1. A method for measuring fluid quality, comprising:
insonifying, using a first transducer, a fluid to be measured using ultrasound energy generated by two or more transducers in a generated frequency range spectrum from about 500 KHz to 5 MHz over a period of time, thereby creating cavitation of bubbles in the fluid to be measured, the first transducer and a second transducer being integrated into a ring around a pipe holding the fluid, the second transducer being opposite the first transducer on the ring such that liquid to be insonified flows between the first transducer and second transducer;
receiving, using the second transducer, an analogue signal of the fluid to be measured including ultrasonic energy created by the cavitation of the bubbles in the fluid to be measured;
creating, using a computer, a time domain ultrasound signature based on the analogue signal;
converting, using the computer, the time domain ultrasound signature into a frequency response signature unique to the fluid being measured, wherein the frequency response signature represents the amplitude for each frequency in the generated frequency range spectrum;
classifying the fluid to be measured using the root mean square of the ultrasound energy to characterize the frequency response signature; and
identifying, using the computer, an impurity in the fluid to be measured by matching the classified frequency response signature to a unique identifying signature of a solid or contaminant to be identified, wherein the frequency response signature is compared to a unique identifying signature contained in a library of frequency response signatures.

2. The method of claim 1, further comprising creating a library of frequency response signatures.

3. The method of claim 2, further comprising correlating a frequency response signature from the frequency response signature library to a second fluid, the quality of which is to be measured.

4. The method of claim 2, further comprising training a neural network to correlate a frequency response signature of an unknown to one or more frequency response signatures in the library of frequency response signatures.

5. The method of claim 1, wherein the fluid is insonified by a first transmitting transducer and a second transducer that is receiving ultrasound energy.

6. A method for measuring fluid quality, comprising:
insonifying, using a first transducers, a fluid to be measured using ultrasound energy in a generated frequency range spectrum from about 500 kHz to 5 MHz over a period of time, thereby creating cavitation of bubbles in the fluid to be measured, the first transducer and a second transducer being integrated into a ring around a pipe holding the fluid, the second transducer being opposite the first transducer on the ring such that liquid to be insonified flows between the first transducer and second transducer,
receiving using the second transducer, an analogue signal of the fluid to be measured including ultrasonic energy created by the cavitation of the bubbles in the fluid to be measured,
creating, using a computer, a time domain ultrasound signature based on the analogue signal;
converting, using the computer, the time domain ultrasound signature into a frequency response signature;
classifying, using the computer, the fluid to be measured using the root mean square of the ultrasound energy to characterize the frequency response signature;
creating, using the computer, a frequency response signature library comprising frequency response signatures corresponding to impurities in fluid samples that have been measured;
training, using the computer, an artificial neural network (ANN) to identify and classify future fluid samples in real time using the frequency response signature; and
identify, using the computer, impurities in the fluid by correlating the frequency response signature from the fluid being measured to the frequency response signature library.

* * * * *